United States Patent [19]
Dimitri

[11] 3,991,022
[45] Nov. 9, 1976

[54] PROCESS FOR MAKING LIGNIN REINFORCED POLYMERS

[75] Inventor: Mitchell S. Dimitri, Charleston, S.C.

[73] Assignee: Westvaco Corporation, New York, N.Y.

[22] Filed: July 15, 1974

[21] Appl. No.: 488,480

[52] U.S. Cl. ................................. 260/17.5; 260/3
[51] Int. Cl.$^2$ ..................................... C08L 97/00
[58] Field of Search ........... 260/17.5, 124 A, 124 R, 260/3

[56] References Cited
UNITED STATES PATENTS

| | | | |
|---|---|---|---|
| 3,079,360 | 2/1963 | Sutherland et al. | 260/17.5 X |
| 3,697,497 | 10/1972 | Falkehag | 260/124 A |
| 3,817,974 | 6/1974 | Sirianni et al. | 260/124 R |

OTHER PUBLICATIONS

Keilen et al. (India Rubber World vol. 124, 178, May 1951).

Keilen et al. Rubber Chem. Tech., 20, 1099 (1947).

*Primary Examiner*—J. Ziegler
*Attorney, Agent, or Firm*—Richard L. Schmalz; Ernest B. Lipscomb, III

[57] ABSTRACT

A process is disclosed for producing lignin-polymer compositions. The process comprises coprecipitation of hexamethylene tetramine modified alkali lignin and rubber or resin latices with a gas, such as carbon dioxide or sulfur dioxide. The lignin-latex coprecipitate is then gas dried at a temperature which causes decomposition of the ammonium carbonate or ammonium sulfite which was formed during the precipitation step, leaving a lignin reinforced polymer free of inorganic salts.

6 Claims, No Drawings

PROCESS FOR MAKING LIGNIN REINFORCED POLYMERS

BACKGROUND OF THE INVENTION

1. Field of the Invention

This invention relates to a process for producing lignin reinforced polymer compositions. More particularly, this invention relates to a process for forming lignin-latex coprecipitates and gas drying the coprecipitated lignin/latex slurry to leave a lignin reinforced polymer free of inorganic salts.

2. The Prior Art

Lignin has been found to be an effective reinforcing agent for rubber when incorporated therein by a coprecipitation process as shown in U.S. Pat. No. 2,608,537 to Pollack. Several disadvantageous characteristics of this and other processes have, however, limited any large scale commercialization. Disadvantages inherent in the coprecipitation processes include those connected with the physical characteristics of the lignin rubber coprecipitate, removal of inorganic salts and low melting point of the lignins used.

Lignin-rubber coprecipitates, as ordinarily produced according to prior art techniques, generally have the nature of a paste or mud which is difficult to process to obtain a dry cake or crumb, thus requiring high temperatures or long drying times and the need to be filtered. The particles of the coprecipitate, due to their very small size, tend to fill the pores of any filter medium, resulting in very low filtration and washing rates. When filtered and washed, the particles do not possess much cohesiveness and yield a crumbly filter cake which is difficult to handle during subsequent drying operations. The particles in the filter cake are non-compressible and retain large quantities of water which cannot be expressed by mechanical means and must be removed by application of heat. In general, the solids content of coprecipitates will range from 25 to 35%.

U.S. Pat. No. 3,167,523 to Dimitri discloses a method to improve the processing of modified lignin-rubber coprecipitates by heating a slurry prior to filtration. This added step is absolutely necessary if reasonable filtration rates are to be obtained. The modified lignins are used because they have melting points that are above the temperatures encountered in rubber processing, but these lignin-rubbers are high in inorganic salt content.

U.S. Pat. No. 3,312,643 to Ball discloses still another process for treating lignin-rubber coprecipitates which includes mixing formaldehyde with a slurry of lignin-rubber particles, and heating to cause the lignin and formaldehyde to react.

U.S. Pat. No. 3,697,497 to Falkehag discloses hexamethylene tetramine modifications of lignin used to make a high melting, high surface area lignin by a relatively simple, straight forward reaction which includes spray drying. However, that process requires heat treatment prior to filtration when it is to be used in lignin-rubber coprecipitates.

U.S. Pat. No. 3,808,192 to Dimitri discloses a process for the production of high surface area lignins by spray drying which requires a partial coagulation of lignin prior to spray drying.

While some of the processes discussed herinabove have been proposed for improvements of the physical characteristics of lignin-rubber coprecipitates, these processes have either not completely solved the problems or have resulted in degradation of the properties of cured rubber prepared from coprecipitates. Consequently, it is the primary object of this invention to provide a process for making lignin reinforced rubber and resin polymers whereby heat treatment and filtration steps are eliminated, thus greatly simplifying operations. Another object of this invention is to provide a process whereby lignin-latex coprecipitates can be obtained without degrading the properties of the cured polymer. An additional object of this invention is to provide a process for making reinforced rubber and resin polymers using a modified lignin having a high melting point. Still another object of this invention is to provide a process whereby a hexamethylene tetramine modified lignin is coprecipitated with a latex using carbon dioxide or sulfur dioxide and gas dried.

Other objects, features and advantages of this invention will become evident from the foregoing detailed description of the invention.

SUMMARY OF THE INVENTION

The process of this invention beings with using the ammonium salt of an alkali lignin modified with hexamethylene tetramine. The hexamethylene tetramine modified lignin is intimately mixed with rubber or resin latices to form an emulsion. The emulsion is then acidified with carbon dioxide or sulfur dioxide to bring about precipitation of the lignin simultaneously with the coagulation of the latex and the formation of ammonium carbonate or ammonium sulfate depending upon which gas is used for the acidification. The lignin-latex coprecipitate slurry is then dried in a moving gas stream at or above the decomposition temperature of the ammonium carbonate or ammonium sulfate, respectively, leaving a lignin reinforced polymer free of inorganic salts.

DETAILED DESCRIPTION OF THE INVENTION

The lignins employed in the process of this invention are the type known as "alkali lignin" obtained from the black liquor formed during the manufacture of pulp by the sulfate or kraft process. The alkali lignins are insoluble in water, but soluble in alkali.

The alkali lignin is dissolved in an alkaline solution of ammonium hydroxide. Solubilizing the lignin in an all ammonia solution is preferred when large surface area products are to be produced so that no inorganic materials will be present during the drying or remain after the drying. Only sufficient ammonia is added as is necessary for solubilizing the lignin.

The ammonium lignate starting material is then modified with hexamethylene tetramine. The reaction with hexamethylene tetramine is done to increase the melting point of the lignin. This step in the process is carried out by adding hexamethylene tetramine to the lignate solution which is heated from 70° to 180° C., preferably 90° to 110° C. Time required for the reaction varies with the temperature; however, at least 2 hours are generally required for the reaction to be completed; and it is preferable to heat only until the reaction is complete. The molar ratio of hexamethylene tetramine to lignin can be varied from one-half to one-eighth mole per mole of lignin, which reduces the acetone solubility to almost zero.

In the practice of this invention, an emulsion of hexamethylene tetramine modified lignin and rubber latex or resin latex is prepared by adding a mixture of a solution of modified lignin to the latex and intimately mixing until an emulsion is formed. Although the ratio of modified lignin to latex is not normally critical, it is preferable that the modified lignin and latex be in a weight ratio of from 10:1 to 1:10.

When the emulsion of lignin-latex particles has been prepared, the emulsion is precipitated with carbon dioxide or sulfur dioxide. Volatile salts are produced upon acidifying the hexamethylene tetramine modified ammonium lignate and latex with carbon dioxide or sulfur dioxide. When the coprecipitate that is formed is dried, the salts sublime or decompose leaving the acid form of the lignin. The residual acids which may be present, carbonic or sulfurous, also decompose upon drying. The removal of these contaminants eliminates the need for filtration and washing.

The removal of salts and acids by sublimation permits the use of lower drying temperatures. Drying temperatures above, as well as, below 300° F. can be used with the lignin-latex coprecipitates prepared with hexamethylene tetramine modified lignins and acidified with $CO_2$ and $SO_2$, as ammonium carbonate decomposes at 140° F. and ammonium sulfite at 300° F.

The drying techniques used are those utilizing a moving gas, such as air or an inert gas, so that the sublimed or decomposed salts will be swept away during the drying step. The drying methods include, for example, spray drying, fluid bed drying, jet drying and the like. Since the hot gases used to heat the dryers may often be above 300° F., the ammonium compounds are subjected to temperatures above their decomposition temperatures; and they break down to ammonia and carbon dioxide or sulfur dioxide. These gases are swept out with the dryer exhaust gases and no trace remains in the dry lignin-latex coprecipitate.

Thus, the improved process eliminates the need for heat treatment which requires equipment of a specialized nature such as agitators and close temperature control. In addition, the filtration step is also eliminated which requires filters and auxiliary equipment to separate, as well as, wash the coprecipitate solids.

When carbon dioxide or sulfur dioxide is used to cause the coprecipitation, the best properties in the cured polymer are obtained at a pH beween 5 and 7.5. Thus, it is not necessary to lower the pH to more conventional prior art pH's of between 2 and 5. Furthermore, the coprecipitation may be carried out quite easily at room tempertures.

While the invention has been illustrated herein with styrene butadiene-type rubbers, it has also been found that similar results can be obtained utilizing other types of rubber and resin available in latex form. Thus, natural rubber, butadiene-acrylonitrile rubber, butyl rubber and polysulfide rubber latices can be employed with results similar to those indicated in the examples set forth hereinbelow. The resin latices which may be used in the process of this invention include styrene-butadiene (80/20) resin, polystyrene resins, polyvinyl chloride resin, polyvinyl acetate resin, acrylic resins and polyvinylidene chloride resins.

The practice of this invention may clearly be seen in the following examples.

EXAMPLE 1

A hexamethylene tetramine modified lignin solution was prepared with a hexa:lignin ratio of 0.5:1 and 10 moles ammonia per mole of lignin. The solution was heated at 90° C. for 3 hours to effect the reaction. 26.7 pounds of this solution containing 3.0 pounds alkali lignin was circulated in PV-6 Eppenback Colloid Mill and 1.66 pounds of a plasticizer, Sundex 53, were added and emulsified. This emulsion was added to 17.7 pounds of styrene-butadiene (1712) latex containing 4.43 pounds of rubber and 66.8 pounds of water. The mixture was then placed in a 20-gallon vessel agitated with a Gifford-Wood L-2 Monomixer while $CO_2$ gas was sparged into the vortex of the mixer. The pH was decreased from 9.8 to 7.2 in 14 minutes. This decrease in alkalinity causes coprecipitation of the rubber and lignin forming a creamy, low viscosity slurry of 8.4% solids.

This slurry was then dried at the rate of 23.3 pounds/hour of solids to produce a dry product of 98.7% solids. A Bowen Laboratory Model spray dryer was used with air atomization at an inlet gas temperature of 300° F. and an outlet temperature of 200° F.

The physical properties of the compounded coprecipitate were compared to a reinforced rubber using an unmodified lignin and to a hexamethylene tetramine modified lignin coprecipitated according to U.S. Pat. No. 3,167,523. The results are shown in the Table below.

EXAMPLE 2

A solution of hexamethylene tetramine modified lignin was prepared containing 3.0 pounds lignin in 26.5 pounds of solution. This was mixed with 17.65 pounds of 25.0% styrene-butadiene (1712) latex and 58.8 pounds of water in a 20-gallon tank agitated with an L-2 Gifford-Wood Monomixer. Sulfur dioxide gas (0.6 pound) was sparged into the mixer vortex to reduce the pH from 9.8 to 7.5 causing coprecipitation of the lignin.

The slurry was dried in the Bowen spray dryer at the solids feed rate of 21.4 pounds/hour, using the same operating conditions indicated in Example 1.

This material when mixed with 37.5 parts of Sundex 53 per hundred parts of rubber and cured gave the physical properties shown at Sample 4 in the Table below.

| Sample | 1 | 2 | 3 | 4 |
|---|---|---|---|---|
| Type of Lignin Process Used | Unmodified Conventional | Hexa Conventional | Invention | Invention |
| Physical Properties (Typical) | | | | |
| 1. Productive Mooney | 40 | 74 | 66 | 54 |
| 2. Modulus, p.s.i. | 470 | 810 | 560 | 840 |
| 3. Tensile Strength, p.s.i. | 2190 | 2260 | 3490 | 3360 |
| 4. Elongation, % | 710 | 610 | 700 | 620 |
| 5. Hardness, lbs./in. | 44 | 62 | 58 | 56 |

-continued

| Sample | 1 | 2 | 3 | 4 |
|---|---|---|---|---|
| Type of Lignin Process Used | Unmodified Conventional | Hexa Conventional | Invention | Invention |
| 6. PICO | 45 | 57 | 65 | 68 |

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:
1. A process for preparing polymers reinforced with lignin consisting essentially of,
  a. reacting in an alkaline medium an ammonium salt of an alkali lignin with from 1/8 to 1/2 mole of hexamethylene tetramine per mole of lignin at a temperature between 70° C. and 180° C.,
  b. intimately mixing the hexamethylene tetramine modified lignin with a latex to produce an emulsion of lignin-latex particles,
  c. acidifying said emulsion with an acidifying agent from the group consisting of carbon dioxide and sulfur dioxide to form a slurry of coprecipitated lignin-latex particles and ammonium carbonate or ammonium sulfite respectively, and
  d. drying the slurry in a moving gas stream to evaporate and remove the ammonium carbonate or ammonium sulfite and to leave the lignin present in the polymer in the free-acid form.

2. The process of claim 1 wherein said gas drying is selected from the group consisting of spray drying, fluid bed drying and jet drying.

3. The process of claim 1 wherein said acidifying agent is carbon dioxide.

4. The process of claim 1 wherein said acidifying agent is sulfur dioxide.

5. The process of claim 1 wherein said hexamethylene tetramine modified lignin and said latex are in a weight ratio of 10:1 to 1:10.

6. The process of claim 1 wherein said latex is a member of the group consisting of styrene-butadiene rubber, styrene-butadiene resin, polystyrene resin, butyl rubber, polysulfide rubber, polyvinyl chloride, polyvinyl acetate resin, acrylic resin and polyvinylidiene chloride resin.

* * * * *